June 23, 1936.   C. P. EVANS   2,044,975
ADDING MACHINE
Filed Aug. 17, 1931   4 Sheets-Sheet 1

INVENTOR
Clyde P. Evans
by Carr & Carr
HIS ATTORNEYS.

June 23, 1936.  C. P. EVANS  2,044,975
ADDING MACHINE
Filed Aug. 17, 1931   4 Sheets-Sheet 2
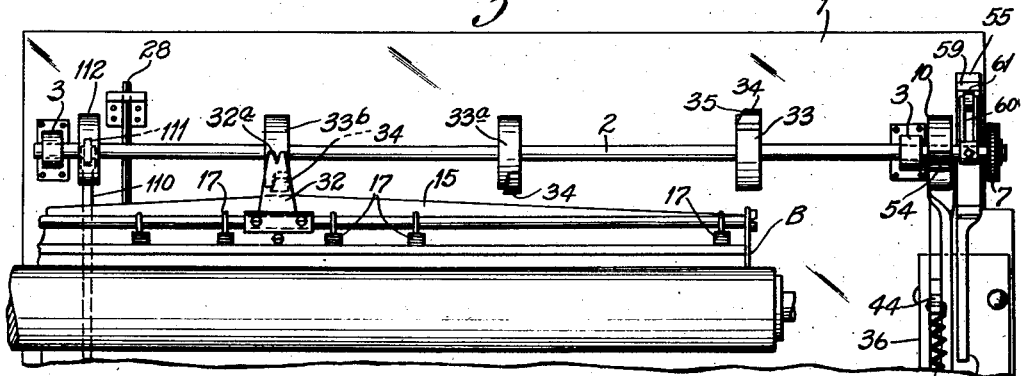
Fig. 5.
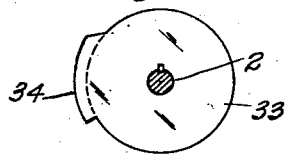
Fig. 6.
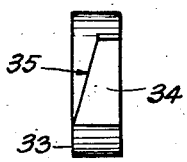
Fig. 7.
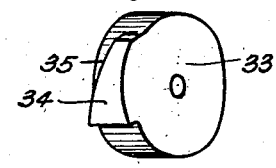
Fig. 8.
Fig. 9.
| OLD BALANCE | DATE MEMO | CHARGES | ✓ | DATE MEMO | CREDITS | ✓ | BALANCE |
|---|---|---|---|---|---|---|---|
| 12.00 | MAY 14 | 2.00 | | | | | 14.00 |
| 14.00 | MAY 14 | 3.00 | | | | | 17.00 |
| 17.00 | MAY 14 | 4.00 | | | | | 21.00 |
Fig. 10.
| OLD BALANCE | DATE MEMO | CHARGES | ✓ | DATE MEMO | CREDITS | ✓ | BALANCE |
|---|---|---|---|---|---|---|---|
| 23.00 | | | | MAY 14 | 4.00 | | 19.00 |
| 19.00 | | | | MAY 14 | 2.00 | | 17.00 |
| 17.00 | | | | MAY 14 | 1.00 | | 16.00 |
INVENTOR:
Clyde P. Evans
by Campbell
HIS ATTORNEYS.

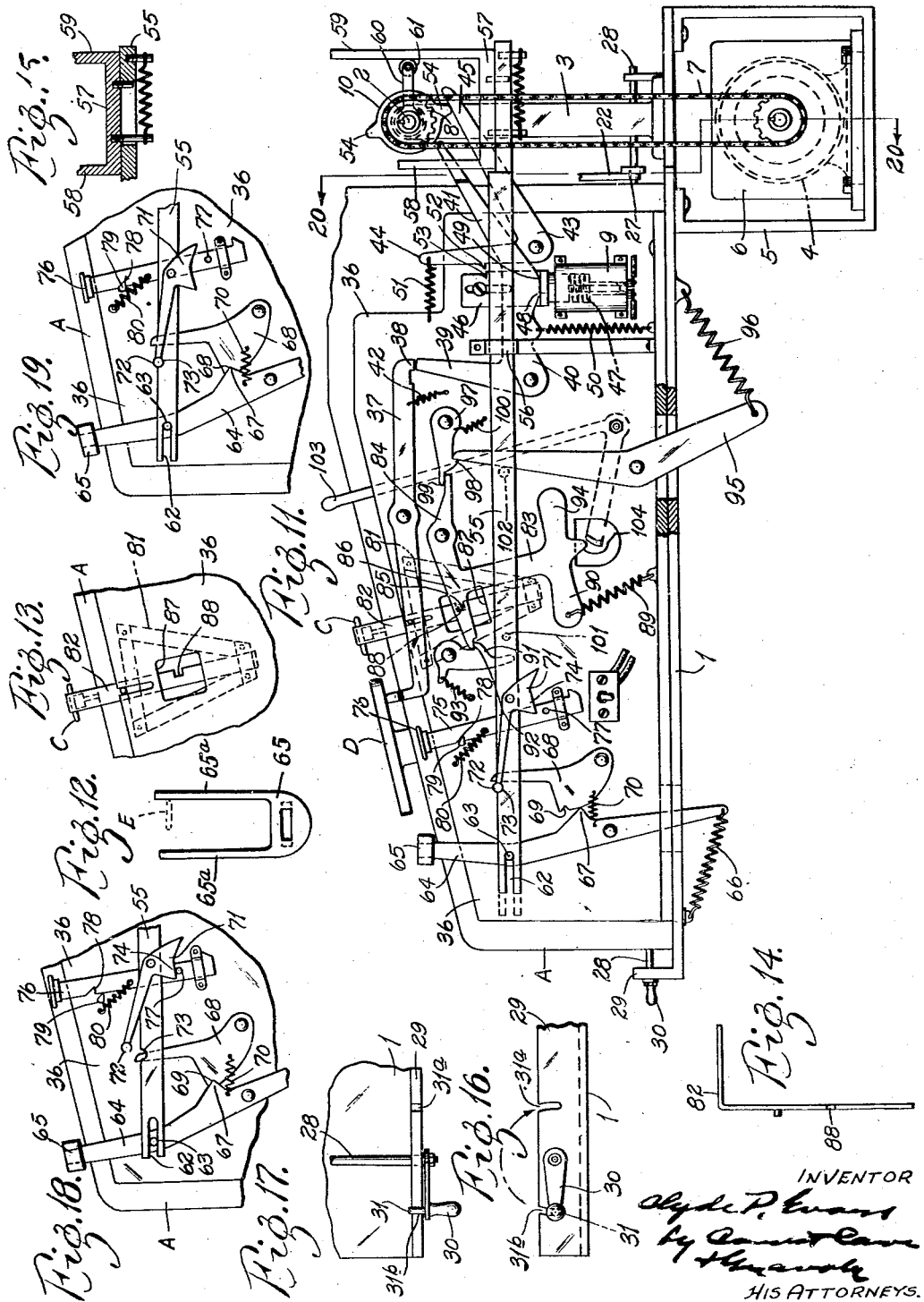

Fig. 20.

Patented June 23, 1936

2,044,975

UNITED STATES PATENT OFFICE 2,044,975

ADDING MACHINE

Clyde P. Evans, St. Louis, Mo.

Application August 17, 1931, Serial No. 557,440

22 Claims. (Cl. 235—60)

My invention relates to adding machines, particularly to an operating mechanism in the nature of an adjunct to an electrically operated adding machine of the well-known Burroughs portable statement type. The principal object of my invention is to automatically perform certain steps that would ordinarily require manual performance on the part of an operator in using such a machine in preparing a conventional bookkeeping sheet; and with such a machine equipped with my improvement, it is capable of doing the same work as the larger, complicated and comparatively expensive machines extensively used in commercial bookkeeping systems. Furthermore, in such systems, the machines must be capable of performing subtraction as well as addition to take care of both "charge posting" and "credit posting"; and another object of my invention is to provide simple adjusting means for changing the operation of such machines from either of these kinds of work to the other.

My invention consists principally in a series of cams for automatically controlling the operation of an adding machine, said cams being mounted on a shaft driven by an auxiliary motor under the control of an electric switch, and means for controlling such switch by one of said cams and the manually operated actuating lever or bar extending from the machine. My invention also consists in a depressible date key mechanism controlled by one of the cams and provided with a set of movably adjustable key pressers to actuate a particular set of date keys automatically. My invention further consists in an adjustable stop mechanism adapted to engage a member on the paper carriage whereby lateral shifts thereof may be controlled for stopping the carriage in different sequences of columnar positions. My invention also consists in the parts, combinations and arrangements of parts hereinafter described and claimed.

Figure 1:
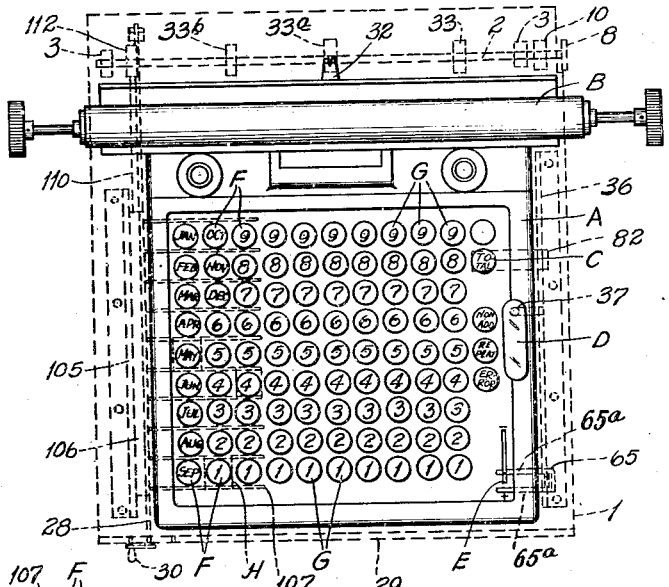
Figure 2:
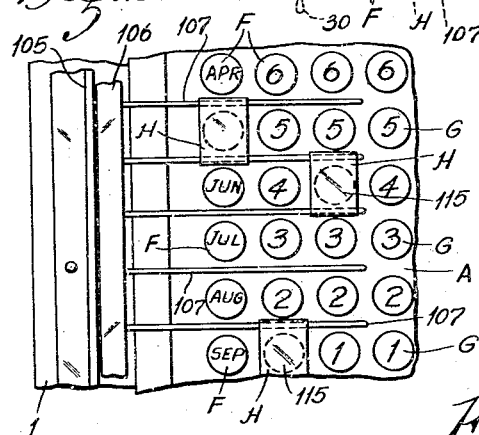
Figure 4:
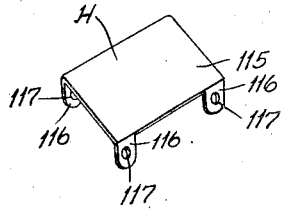
Figure 3:
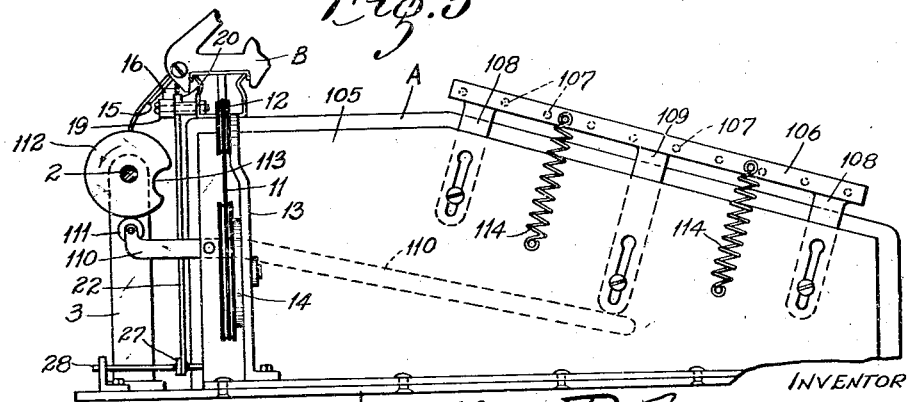

In the accompanying drawings which form part of this specification and wherein like reference symbols refer to like parts wherever they occur, Fig. 1 is a top plan view of a well-known type of adding machine equipped with my invention which is shown diagrammatically in dotted lines, Fig. 2 is an enlarged fragmentary top plan view of a part of the left-hand portion of the machine, showing the adjustable date key depressing mechanism, Fig. 3 is a left-hand side elevation of a part of the machine showing the means for operating the date key mechanism, Fig. 4 is a perspective view of an adjustable date key pressing member hereinafter called a date key presser, Fig. 5 is a plan view looking down on the rear portion of a machine equipped with my invention and showing the arrangement of cams for controlling the automatic operation of the machine, Fig. 6 is a detail side view of one of the controlling cams used for tripping the paper carriage to release it so that it can move over to its next columnar position, Fig. 7 is a detail front view of the cam shown in Fig. 6, Fig. 8 is a perspective view of the cam shown in Fig. 6, Fig. 9 is a plan view of a loose leaf ledger sheet showing charges posted thereon, Fig. 10 is a view of a loose leaf ledger sheet showing credits posted thereon, Fig. 11 is a right-hand side view of a machine and construction embodying my invention, Fig. 12 is a top plan view of the member used for connecting the construction embodying my invention to the subtract lever of the machine, Fig. 13 is a side view of the central portion of Fig. 11 with a number of levers omitted in order to show more clearly the mechanism for operatively connecting the total button of the machine to the construction embodying my invention, Fig. 14 is an end view of the connecting member shown in Fig. 13, Fig. 15 is a vertical longitudinal sectional view taken through the middle of the rear end portion of the longitudinal bar member shown in Fig. 11, Fig. 16 is a front view of the means at the front of the machine for changing the operation of the machine either from posting credits, or posting charges, to the other, Fig. 17 is a plan view of Fig. 16, Fig. 18 is a side view of the adjustable subtract lever actuating mechanism moved in such position as to render the subtract lever inoperative, Fig. 19 is a side view of the subtract lever actuating mechanism showing it after it has moved the subtract lever into "plus" position, and Fig. 20 is a view along the line 20—20 in Fig. 11 showing the adjustable means controlling the action of the paper carriage for changing the function of the machine from either posting credits, or posting charges, to the other.

In the construction illustrated, a standard electrically operated Burroughs portable statement machine A of the type generally illustrated by Horton Patent No. 1,853,050 is equipped with my invention which I have preferred to show as an auxiliary attachment thereto. For the purpose of more readily understanding the ensuing description, it is well to bear in mind that the internal mechanisms of the standard machine A are in no way altered by my device, as it merely actuates automatically several of the ordinarily manually operated levers extending from the machine; and accordingly, I have omitted showing any such internal mechanisms as anyone skilled in the art could readily supply a description thereof.

In the rear of the standard machine A is provided a movable transverse paper carriage B which is altered slightly, particularly in the parts for holding the same in its different columnar positions, from the usual form, to conform to my invention. On the right-hand side of the machine is provided: the usual total button C operatively connected to the internal totalizing mechanism and operating motor M: the starting lever or commonly called print bar D operatively connected to the operating motor: and, the subtract lever E which is operatively connected to the accumulating mechanism. On the face of the machine are provided the usual date keys F, and the item keys G which I have shown in a seven column arrangement.

The machine A is removably mounted on a suitable base plate 1. Extending parallel to the line of lateral movement of the paper carriage B in the rear of the machine, is a cam shaft 2 mounted in horizontal bearings provided in brackets 3 extending upwardly from the base plate 1; and mounted on the cam shaft 2 is a series of cams, which control the shifting of the paper carriage and the actuating of the various operating levers extending from the machine. An auxiliary electric motor 4, mounted in a boxlike case 5 attached to the underside of the base plate 1, is operatively connected to a gear speed reducer 6 which drives a sprocket chain 7 trained around a sprocket wheel 8 mounted on the cam shaft 2; and an electric switch 9 is operatively connected to said motor. For the purposes of the present description, it will suffice to say, that switch 9 controlling the auxiliary motor 4, is operatively connected to the actuating bar D of the machine in such manner that when the bar D is depressed, the auxiliary motor 4 will start to drive the cam shaft 2; and after one-half of a revolution thereof, hereinafter called a cycle, the controlling switch 9 is opened to stop the auxiliary motor by mechanism under the control of a cam 10 provided on the cam shaft 2.

The paper carriage B is pulled from right to left when it is free to move by any suitable potential means. I prefer to use a cord 11 having one end attached to the paper carriage B and then trained around a pulley 12 mounted on a bracket 13 extending from the base plate 1 on the left hand side of the machine and having its other end operatively connected to a spring barrel pulley 14 mounted on the bracket 13 below the pulley, said spring barrel pulley having a spirally shaped groove for winding up the cord 11. Obviously, this arrangement insures proper movement of the paper carriage near the end of its travel as the load on the spring is reduced as it unwinds on account of the spirally arranged pulley groove.

Hinged along the rear end of the paper carriage is a transverse narrow flap member 15 normally held in a downwardly extending position and abutting against a lug 16, by means of a series of coil springs 17 secured to the narrow flap 15 below its hinge line and to the paper carriage; and provided on the underside of said flap in the center thereof is a downwardly extending lug 18. Mounted on the rear of the machine and overhung by the flap member 15 is a transverse bar 19 having an upwardly extending lug 20 near each end in position to engage the lug 18 on the underside of the flap 15 for preventing lateral movement of the carriage at its initial and final columnar positions. The carriage is stopped at either of the two intermediate columnar positions (depending upon which type of accounting work is to be performed) by means of upwardly extending stop lugs 20a and 20b provided on each end, respectively, of a simple rocker bar 21, said bar being fulcrumed at its center on the transverse bar 19. An arm 22 extending downwardly from the center of the rocker bar 21 has a longitudinal slot 23 in its lower end which receives a pin 24 extending from a lateral arm 25. The arm 25 has one end resting between the forks of a U bracket 26 extending upwardly from the base plate 1 in the rear of the machine A, and the other end of said arm is connected to a crank arm 27 provided on the rear end of a rod 28 extending along the left hand side of the machine. This rod extends through an opening provided in an upright flange 29 at the front of the base plate 1; and provided on the front end of said rod 28 is a small crank handle 30 having a pin 31 in alinement with the handle thereof, which pin 31 is adapted to engage slots 31a and 31b in the upright flange 29 at each end respectively, of the rotatable movement of said crank. Obviously, by moving the crank handle 30 in one position, for example with the pin 31 in the slot 31b, the mechanism connecting it to the rocker bar 21 causes the same to tilt in such position that the lug 20b at one end thereof is raised above the transverse bar and in position to stop the paper carriage in that particular columnar position; and at the same time the lug on the other end of the rocker bar is depressed below the bar to render it inoperative in stopping the movement of the paper carriage.

Provided on the top of the hinged flap 15 at the center is an outwardly extending tripper arm 32 having a split end whose left hand branch 32a is curved downwardly. Three cams 33, 33a and 33b, each comprising a circular disk having a cam extension 34 thereon and a diagonal shoulder 35 are mounted on the cam shaft 2 adjacent to the first three stop lugs on the transverse bar respectively. These cams are adapted to raise the tripper arm 32 at the proper time for allowing the paper carriage to move over to its next position; and the diagonal shoulders 25 are adapted to engage the downwardly curved branch 32a of the tripper arm 32, whereupon rotation of the cam tends to overcome the inertia of the paper carriage and shove it over towards its next position simultaneously with the tripping thereof. Cams 33a and 33b are of the same size and shape and are positioned on the cam shaft 2 in the same manner; whereas cam 33, which is also of the same size and shape as the other two is positioned on the cam shaft 2 at 180° to the other two; and cam 33a comes into play in "posting charges" whereas cam 33b comes into play in "posting credits".

The mechanism for operating the auxiliary motor switch and the switch itself are mounted on a side plate 36 secured to the base plate 1 adjacent to the right hand side of machine A and parallel thereto. A simple lever 37 is fulcrumed on the outside top center portion of said side plate and its forward end curves over toward the top of the machine and then upwardly to engage the actuating bar D; and the other end of said lever 37 is provided with a downwardly extending catch 38 for normally engaging and holding the end of an arm 39 of an irregular V-lever 40 fulcrumed at its vertex on said side plate, and the other arm 41 of this V-lever 40 terminates near the cam shaft 2; and a coil spring 42 is secured to the catch end of the simple lever 37 and to the side plate 36 below the lever. Mounted on said side plate 36 rearwardly from the V-lever 40 is a second V-lever 43, which is disposed closer to the side plate 36 than lever 40 so that its forward arm 44 clears the same. The other arm 45 of said V-lever 43 extends rearwardly and terminates at a point slightly below the cam shaft 2.

Mounted on the side plate 36 between the fulcrum points of the two V-levers and slightly below them is the auxiliary motor switch 9; and operatively connected to the switch is an upwardly extending slidably mounted plate 46 hereinafter called the switch plate. This plate is adapted to close the switch in its lower position. However, normally holding the switch open is a coil spring 47 interposed between the switch and a horizontal bracket 48 extending from the switch plate. The first V-lever 40 is provided on the underside of its rearwardly extending arm 41 with a flared out portion 49 for resting on the top of the horizontal switch plate bracket 48; and a coil spring 50 is secured to the base plate 1 and to the arm 41 of the V-lever 40 adjacent to the flared out portion. Another coil spring 51 is secured to the arm 44 of the second V-lever 43 and to a point on the side plate forwardly therefrom; and the forward arm 44 of the second V-lever has a tooth 52 for engaging a notch 53 in the switch plate 46. Mounted on the cam shaft 2 is the cam 10 having oppositely disposed cam extensions 54 on its periphery in position to engage the rearward arms of the two V-levers and arranged to rotate the second V-lever 43 clockwise, and the first one 40, counter-clockwise, in the order named.

Both the subtract lever and total button operating mechanisms are operatively connected to a longitudinal bar member 55 located on the outside of the side plate 36 and slidably mounted in a bracket 56 extending from the base plate 1. This bar extends under the cam shaft 2 and has a U-member 57 mounted thereon which is preferably yieldably mounted in such manner as to be capable of slight longitudinal movement on the bar to prevent injury to the mechanism should the bar be reciprocated at the wrong time. The front and rear branches 58 and 59 of the U-member extend upwardly on each side of the cam shaft 2, respectively; and mounted on the cam shaft 2 in the plane of the U-member 57 is a cam arm 60 having a small roller 61 on its end for engaging the branches of the U-member for reciprocating the longitudinal bar backwards and forwards, periodically, as the cam shaft is rotated. The forward end of the reciprocating bar 55 has a longitudinal slot 62 for receiving a pin 63 extending from a vertically disposed simple lever 64 above the fulcrum point thereof, said lever 64 being mounted on the side plate 36 adjacent to the subtract lever E of the machine A. The upper end of this lever 64 has a removably mounted fork member 5 having two prongs 65a (see Fig. 12) which extend over the face of the machine so that one prong extends on one side of the subtract lever and the other prong on the other side for loosely engaging the subtract lever. The lower end of said lever 64 extends through an opening in the base plate and a coil spring 66 is attached to this end and to the bottom of the base plate 1 near the front thereof. Said lever 64 is provided on its rearward edge adjacent to the fulcrum point thereof with a cam extension 67; and mounted adjacent to this cam extension is an upwardly extending tripper lever 68 having a cam tooth 69 for cooperating with the cam extension 67 on the lever 64; and a coil spring 70 is connected between the lever 64 and the tripper lever 68 slightly above their fulcrumed points.

Fulcrumed on the outside of the longitudinal reciprocating bar 55 in the vicinity of the upper end of the tripper lever 68 is a cam lever 71 having an inwardly extending pin 72 on its forward end adapted to rest in a slot 73 provided therefor in the reciprocating bar forwardly from the upper end of the tripper lever 68; and the cam lever 71 is provided on its under side below its fulcrum point with a triangular shaped cam extension 74. Slidably mounted on the side plate adjacent to the cam lever 71 is a diagonal member 75 having a press button top 76, and a pin 77 extending outwardly therefrom near its lower end and adapted to engage the cam extension 74 during reciprocation of the bar as shown in Fig. 18. However, this diagonal member has a notch 78 in its side adjacent to a lug tooth 79 on the side plate 36 and a coil spring 80 is secured to the diagonal member 75 below the notch and to the side plate above it whereby the diagonal member may be depressed so that the tooth engages the notch which prevents the pin from engaging the cam extension in this position during reciprocation of the bar 55.

Slidably mounted on the inside of the side plate in a pouch like frame 81 and adjacent to the total button of the machine is a diagonal member 82 (see Fig. 14) having its upper end extending over the face of the machine and engaging the top of the total button. Provided on the outside of the side plate 36 adjacent to this diagonal member is an I lever 83 fulcrumed on its upper right-hand flange arm 84 and having a pin 85 extending from its upper left-hand flange arm 86 which extends through an opening 87 in the side plate and engages a slot 88 in the side of the diagonal member 82 engaging the total button. A coil spring 89 is secured to the outer end of the lower left-hand flange arm 90 and to the base plate 1; and obviously, when the I lever is free to move this spring 89 will tend to depress the total button. Fulcrumed at the side plate is a catch lever 91 having a catch 92 for engaging the end of the upper left-hand flange arm 86 of the I lever for normally holding the same to prevent it from rotating. Preferably a coil spring 93 is secured to the base plate and to said catch lever 91 for holding the same in catching position. Fulcrumed on the side plate adjacent to the lower right-hand flange arm 94 of the I lever is a large vertically disposed simple lever 95 having its lower arm extending through an opening in the base plate; and a coil spring 96 is secured to the lower end of this lever and to the base plate for pulling the upper arm of this lever against the lower right-hand flange arm of the I lever. However, this is normally prevented by a small catch lever 97 having a downwardly extending catch 98 thereon for engaging the upper end of said lever, said catch lever being fulcrumed adjacent to the end of the upper right-hand flange arm of the I lever and having a tip 99 extending over said arm and normally resting thereon; and secured to said catch lever 97 and to the base plate below is a small coil spring 100 for keeping the tip of said catch lever down on the arm of the I lever. Extending from the longitudinal bar member 55 between the catch lever 91 and the I lever is a pin 101 adapted to engage the catch lever 91 for tripping it at the proper time; and extending from the bar 55 on the other side of the I lever is another pin 102 for engaging the large vertically disposed simple lever 95 during the rearward travel of the bar 55 for bringing this lever back to its normally caught position.

Preferably, in order to render the total button operating means inoperative, a bent hand lever 103 is fulcrumed on the side plate and capable of being rotated so that the arm opposite the handle arm is in position to engage a lug 104 extending from the bottom of the I lever for preventing rotation thereof at any time and also allow the removal of the diagonal member 82 engaging the total button.

The mechanism for controlling the operation of the date keys is mounted on a side plate 105 secured to the base plate 1 adjacent to the left-hand side of the machine and parallel thereto. A longitudinal bar member 106 having a series of lateral rods 107 extending over the date keys F, said rods being arranged one in each horizontal space between the keys, is supported on two diagonal members 108, which are slidably mounted on the side plate 105; and a third diagonal member 109 is slidably mounted on the side plate 105 and has its upper end engaging the center portion of the longitudinal bar member 106. The lower end of this diagonal member rests on the forward end of a simple lever 110 fulcrumed on the side plate 105 and extending rearwardly under the cam shaft 2 where it is provided with a small roller 111 engaging the periphery of a cam 112 for normally holding the longitudinal bar member 106 and lateral rods 107 above the face of the date keys F. However, the cam 112 is provided with a substantially semicircular recess 113 in its periphery for receiving the roller 111 which allows the forward end of the lever 110 to lower a sufficient amount so that the lateral rods of the key depressing mechanism are depressed downwardly between the rows of the date keys; and this action is made more positive by coil springs 114 secured to the bar member 106 and to the side plate 105 below the bar member.

The lateral rods 107 extending over the face of the date keys are adapted to receive adjustable key pressers H comprising a small plate 115 of sufficient size to cover the top of a single key and having lugs 116 at each corner provided with openings 117 for sliding the plates on the lateral rods over any particular date key; and, obviously, by using three of these key pressers H and arranging them in particular positions with respect to the date keys, a particular set of keys defining a certain date may be operated.

As is well known, a standard adding machine, of the type shown and described herein, is constructed to operate almost instantaneously with the depressing of its actuating bar. In the operation of this type of machine, after the particular set of controlling levers are set to cause the machine to operate in a particular manner, and then the actuating bar is depressed, the machine performs its work immediately and then stops. My auxiliary operating mechanism, which is adapted to automatically set the controlling levers of the machine, does not begin to move any of these controlling levers until after the machine has completed its operations and is stopped. Although the auxiliary motor starts immediately after the actuating bar is depressed, it is to be noted that the various controlling cams on the cam shaft 2, as they are shown in the drawings, will not start to operate any of the controlling levers of the standard machine until after the cam shaft 2 has rotated about 90 degrees, and since the auxiliary motor drives the cam shaft 2 through the gear speed reducer 6, the cam shaft 2, obviously, rotates at a comparatively slow speed, and ample time is provided to allow the standard machine to complete its operations before the auxiliary mechanism operates any of the controlling levers of the machine. By keeping these facts in mind, the ensuing description of operation of my invention can be more readily understood.

The operation of my machine and attachment thereto for the purpose of "posting credits" is as follows:

The movable date key pressers H are arranged over the particular group of date keys defining the date as of which items are to be posted; and the crank handle 30 in front of the machine is positioned so that the pin 31 extending therefrom rests in the "credit posting" slot 31b and also the push button key 76 is depressed to its lower caught position so that the pin 77 will not engage the triangular cam extension during reciprocation of the bar 55. With these members in such position, the mechanism is properly set for "credit posting" operations.

The paper carriage B is then manually moved over to the right-hand side of the machine so that the ledger sheet (see Fig. 10) carried thereby has its old balance column in recording position. The particular item keys for the old balance are then depressed, after which the starting bar D is depressed. This operation causes the standard machine A to operate to print the old balance and store the amount in the accumulating mechanism, and then the machine stops. At the same time that the bar D is depressed, the auxiliary mechanism also starts the auxiliary motor to rotate shaft 2, and it travels about 60 degrees while the standard machine is completing its operation. The auxiliary motor is started because the actuating bar D, upon being depressed, raises the catch end of the simple lever 37 which releases the first V lever 40 allowing spring 50 to pull the switch plate 46 downwardly to close the switch 9 which starts the auxiliary motor 4. The motor 4, being operatively connected to the cam shaft 2, starts to drive the same in a clockwise direction and the lowermost cam extension 54 on the cam 10 moves away from the end of the arm 45 of the second V lever 43 which allows spring 51 to pull the V lever around until the tooth 52 thereon engages notch 53 in the switch plate 46. This, obviously, keeps the switch in closed position, which is necessary because the same cam extension 54 by this time has moved sufficiently far enough around to engage the rearward arm 41 of the first V lever 40 to move it back to its normal caught position. After the cam shaft 2 has traveled one half of a revolution, the oppositely disposed cam extension 54, which was initially in the upper position, has moved around far enough so that it engages the arm 45 of the second V lever 43 causing it to move downwardly with the result that the tooth 52 is pulled out of the notch 53 allowing the switch to open to stop the auxiliary motor 4. During the first cycle or initial half revolution of the cam shaft as described, the respective controlling cams thereon come into play for tripping the paper carriage to allow it to move to the credit position, for actuating the date key mechanism, and for raising the subtract lever to the minus position, and all of the cams are set so that they will begin to perform these functions after the cam shaft has rotated about 90 degrees and, therefore, cannot interfere with the operation of the standard machine since it has already completed its operation; the specific operation of each are as follows:

After the cam shaft 2 has rotated about 90 degrees, cam 33 raises the tripper arm 32 on the paper carriage to release the same and the carriage is then automatically pulled over to the credit columnar position by the spring barrel pulley 14; and, obviously, the carriage is stopped at the "credit posting" position on account of the lug 18 on the underside of the flap 14 engaging the stop lug 20b extending above the transverse bar member 19.

The date keys are automatically depressed to register the date, because cam 112 moves around during the first half revolution of the shaft so that after the shaft 2 has rotated about 90 degrees, the roller 111 on the lever 110 will move into the recess 113 in the cam 112 with the result that the coil springs 114 pull the date mechanism downwardly to depress the particular group of keys covered by the key pressers H.

The subtract lever is raised because after the cam wheel has rotated about 90 degrees, the cam extension 60 with the roller 61 thereon begins to engage the arm 59 to push the reciprocating bar 55 rearwardly, and when the cam shaft 2 has rotated about 155 degrees, the pin 72 on the bar 55 strikes the tripper lever 68 to disengage the cam tooth 69 thereon from the cam extension 67 on the lever 64 thereby allowing spring 66 to pull the subtract lever upwardly to its "minus" position.

When the auxiliary motor 4 is stopped, and with the paper carriage in the "credit columnar position", the item keys for the credit amount are depressed and the bar D is again actuated. At this point, it is to be noted that just after the actuating bar is "hit" the various controlling cam and lever mechanisms are in the positions shown in Figs. 3, 5 and 11. The actuation of the bar D in this instance, causes the standard machine A to print the date (the date keys having been depressed during the first cycle of the cam shaft), to print the amount and subtract the amount in the accumulating mechanism; and then the standard machine stops. Here again, the auxiliary motor is started when the bar D is depressed, and the above operation of the standard machine is completed during about 60 degrees of rotation of the cam shaft 2, and after said shaft 2 has rotated about 90 degrees, the cam 33b trips the paper carriage (in the same manner that cam 31 trips the carriage in its old balance position), and the carriage is pulled over into the final balance position.

Also, during this cycle of the cam shaft 2, the cam arm 60 with roller 61 thereon begins to engage the forward arm 58 of the U member 57 after the cam shaft 2 has rotated about 90 degrees with the result that the reciprocating bar member 55 is forced forwardly, and the fork member 65 starts to move the subtract lever toward its "plus" position until the cam shaft has rotated about 150 degrees. At this point, the lever E jumps into plus position as the standard machine is constructed to do, and the prongs of the fork member 65 are spaced far enough apart to accommodate this movement. When the subtract lever moves into its plus position, the lever 64 has rotated a sufficient amount so that the tripper lever 68 is pulled over by the spring 70, and the cam tooth 69 engages the end of the cam extension 67 thereby keeping the lever 64 in this position against the action of spring 66.

During the second cycle of the cam shaft 2 and after it has rotated about 160 degrees, the pin 101 on the reciprocating bar member 155, while moving forwardly, strikes the catch lever 91 which releases the I lever 83 allowing the spring 89 to move the I lever in such manner as to depress the total button and obviously with this movement of the I lever the catch lever 97 is tripped slightly after the total button is depressed with the result that spring 96 can pull the upper arm of the large simple lever 95 against the lower right-hand flange arm 94 of the I lever and, as spring 96 is made comparatively stiffer than spring 89, the I lever is moved back again into its initial position; and during the next rearward movement of the reciprocating bar member 55 the pin 102 will, obviously engage the upper arm of the lever 95 and push it back until it is again caught by the catch lever 97 in its normal position.

When the total button is depressed as described above, it is to be noted that this operation occurs after the subtract lever has moved into its plus position, and the actuation of the total button causes the machine to print the amount of balance, clears the accumulating mechanism and then the standard machine A stops. In the meantime, cam shaft 2 has rotated sufficiently to stop the auxiliary motor thereby completing the second cycle of operation of the cam shaft 2. Obviously, this stopping of the auxiliary motor in no way interferes with the operation of the machine after the total button has been depressed. The two cycles of operation are then repeated for posting other credits.

Obviously, as the automatic operation of my device for the purpose of "posting charges" is very similar to that of "posting credits", it is only necessary to state briefly that, to set the machine for "charge posting" the crank handle 30 is rotated so that the pin 31 rests in the slot 31a with the result that the paper carriage B, after being released from its initial old balance column, is stopped in the second or "charge columnar position"; and the subtract lever mechanism is rendered inoperative by moving the press button 76 so that the diagonal member 75 is released from the lug tooth 79 whereby the spring 90 causes it to rise and holds it in its uppermost position. With the diagonal member 75 in this position, (see Fig. 18) upon movement of the reciprocating bar rearwardly the cam extension 74 of the cam lever 71 engages the pin 77 and this causes the cam lever 71 to move the pin 72 upwardly in such position that it will not trip the tripper lever 68 and hence, the subtract lever will remain in "plus" position at all times during the "charge posting operations".

The Burroughs statement machine to which applicant's auxiliary operating mechanism is especially applicable completes a cycle of operation in approximately 1/116 of a minute and this is true of other machines of a similar type. In equipping the Burroughs machine with an auxiliary operating mechanism embodying the invention, it is preferable to arrange the operating mechanism so that the auxiliary motor driving the cam shaft 2 through the gear speed reducer 6, drives said shaft at a speed of approximately 20 full revolutions or 40 cycles per minute. With this set up, the following schedule of operation of the Burroughs machine and the auxiliary operating mechanism takes place in "posting credits" which should make the description of operation more readily understandable.

Schedule of operation

| Manual | Burroughs machine | Auxiliary device |
|---|---|---|
| First cycle. | (Is timed to make about 116 operations per minute). | (Shaft 2 is timed to make about 20 full revolutions a minute or 40 cycles per minute.) |
| Move carriage to "pick up" position. | | |
| Depress amount keys for "pick up." | | |
| Tap bar D. | Prints pick up and stores the amount accumulators in and cuts out the Burroughs machine motor (time is about 1/116 minute.) | Shaft 2 travels 60° more or less while the Burroughs machine is completing its operation. |
| | | Shaft 2 continues to rotate and at about 90° rotation the cams on shaft 2 begin to operate. |
| | | At about 90° 1. Cam 112 operates date depressors. |
| | | 2. Cam extension 34 trips carriage which slides from pick up to posting position. |
| | | 3. Cam wheel 61 begins to slide part 55 rearward and at about 155° this causes part 72 to trip trigger 68, releasing lever 65, which, pulled by spring 66, sets lever E in subtract position. |
| | | At about 180° 4. Cam 54 breaks contact of auxiliary motor circuit. |
| Second cycle | | |
| Depress amount keys for item to be posted. | | |
| Hit bar. | Prints date (date keys having been depressed as indicated in first cycle). Prints amount and subtracts the amount in the accumulator, and cuts out Burroughs motor. (The time required for above is about 1/116 minute.) | Shaft 2 rotates about 60° while the Burroughs machine is completing its operation. |
| | | Shaft 2 continues to rotate and At about 90° cam extension 34 trips carriage which slides into "Balance" position. At about 130° cam wheel 61 begins to force part 55 forward which causes lever E to be pushed toward add position. |
| | | Lever E continues to be pushed toward its add position until shaft 2 has rotated about 150°. At this point lever E jumps the final 1/8 inch into add position. (E is loosely engaged by arms of part 65. See Fig. 12 to allow room for this 1/8 inch jump of lever E.) Part 55 is still being pushed forward and at about 160° of rotation pin 101 unlatches catch 91 which realizes the totalizer mechanism. This causes total key C to be depressed. |
| | Prints amount of balance in balance column, clears accumulator and cuts out Burroughs motor. | At about 180° cam 54 breaks contact of auxiliary motor circuit. |

The above two cycles are repeated for each posting; and in the next pick up cycle the lever 95, the catch lever 97, and the catch lever 91 are restored by the pin 102 on slide 55, and until then lever 83 remains ineffective since it is held by lever 95.

Obviously, the construction hereinbefore described admits of considerable variation without departing from the spirit of my invention. For instance, instead of making my invention in the form of an auxiliary attachment, it may be feasible to build it directly into a standard machine. Furthermore, it may be practical to use my invention in connection with a hand operated machine, instead of an electrically operated one which could be readily accomplished by hooking up the auxiliary operating mechanism with the hand actuating lever of such a machine; and as numerous other variations may be feasible, I do not wish to limit my invention to the precise construction shown and described.

What I claim is:

1. In combination, an adding machine having a starting member and a total key, and an attachment for making the operation thereof automatic, comprising a rotatable member having a control element operatively connected with said total key to control the actuation thereof, a second control element on said rotatable member, and operating means for operating said control member, said operating means being under the control of said starting member and said second control element.

2. In combination, an adding machine having a starting member and a subtract lever, and an attachment for making the operation thereof automatic, comprising a rotatable member having a control element operatively related to said subtract lever to actuate the same, a second control element on said rotatable member and operating means for operating said rotatable member, said operating means being under control of said actuating member and said second control element.

3. In combination, an adding machine having a starting member and keys, an adjustable date key pressing mechanism associated with said keys for actuating a particular set thereof, a control member for actuating said key pressing mechanism and operating means for operating said control member, said operating means being under the control of said starting member.

4. In combination, an adding machine having a main motor, a starting member and a controlling lever, a control member for actuating said controlling lever, means for actuating said control member in a predetermined timed relation and an auxiliary motor for operating said last means, said auxiliary motor being under control of said starting member.

5. In combination, an adding machine having a main motor, a starting member and a controlling lever, a control member for actuating said controlling lever, means for actuating said control member in a predetermined timed relation and an auxiliary drive mechanism for operating said last means, said auxiliary drive mechanism being under control of said starting member.

6. In combination, an adding machine having a main motor, a starting member, a controlling lever and a movable paper carriage, and an attachment for making the operation thereof automatic, comprising control means for automatically controlling the setting of said controlling lever and the lateral movement of said paper carriage, an auxiliary motor for operating said control means, and a switch controlling said auxiliary motor, said switch being under the control of said starting member.

7. In combination, an adding machine having a motor, a starting member, a subtract lever, a total key and a movable paper carriage, a cam shaft associated with said machine, an auxiliary motor for driving said cam shaft, a switch controlling said motor, a cam on said cam shaft cooperating with said starting member to control the action of said switch, a second cam on said cam shaft for controlling the operation of said total button and said subtract lever and a third cam on said cam shaft operatively located with respect to said paper carriage for controlling the lateral movement thereof.

8. In combination, an adding machine having a starting member and keys, a movably mounted frame extending over the face of said keys, movably adjustable key pressers mounted on said frame, a cam shaft having a cam thereon for controlling the movement of said frame and means for driving said cam shaft under the control of said starting member.

9. In combination, an adding machine having a starting member and date keys, a key depressing mechanism supported over said keys and having a movable key presser thereon for actuating a particular key, a rotatable shaft having a cam thereon for controlling said key depressing mechanism and for operating it at a particular time, and means for driving said cam shaft under the control of said starting member.

10. In combination, an adding machine having a starting member, a total key and a subtract lever, and an attachment for making the operation thereof automatic, comprising a slidably mounted bar member, means for reciprocating said bar member under the control of said starting member and means operatively connected with said bar member for actuating said total key and other means operatively connected with said bar member for actuating said subtract lever.

11. In combination, an adding machine having a starting member and a totalizing mechanism controlling member, a slidably mounted bar, a cam shaft having a cam thereon for reciprocating said bar, means for operating said cam shaft under the control of said starting member, mechanism operatively connected to said totalizing mechanism controlling member to actuate the same and means provided on said bar for releasing said mechanism and for restoring it to its normal position.

12. In combination, an adding machine having a starting member and a subtract lever, a slidably mounted bar member, a cam shaft having a cam for reciprocating said bar member, means for driving said cam shaft under the control of said starting member, mechanism operatively connected to said subtract lever to control the actuation thereof and means provided on said slidably mounted bar member for controlling said mechanism to set the subtract lever in adding and subtracting positions.

13. In combination, an adding machine having a totalizing mechanism member, a reciprocating member, means for reciprocating said member, resilient means for actuating said totalizing mechanism member, holding means for normally preventing such actuation, means provided on said reciprocating member for releasing said holding means and means for restoring said totaling mechanism member to its normal position immediately after actuation thereof.

14. In combination, an adding machine having a totalizing mechanism controlling member, a reciprocating member, means for reciprocating said member, resilient means for actuating said totalizing mechanism controlling member, holding means for normally preventing such actuation, means provided on said reciprocating member for releasing said holding means and other means provided on said reciprocating member for restoring said totalizing mechanism controlling member to its normal position.

15. In combination, an adding machine having a starting member and a total key extending therefrom, a slidably mounted bar, a cam shaft having a cam thereon operatively connected to said slidably mounted bar to reciprocate the same, an auxiliary motor operatively connected to said cam shaft, a switch for controlling said motor, means under the control of said starting member for controlling said switch, a connecting member engaging said total button, an I lever operatively connected to said connecting member, resilient means connected to said I lever for causing movement thereof, a catch lever engaging a flange of said I lever for normally preventing movement thereof, a vertically disposed lever located adjacent to said I lever, resilient means connected to said vertically disposed lever for causing it to engage said I lever, a second catch lever normally preventing said vertically disposed lever from engaging said I lever, said second catch lever having its end resting on a flange of the I lever in such manner that when the I lever is released it will trip said second catch lever, a pin extending from said reciprocating bar in position to engage said second catch lever during movement of the reciprocating bar in one direction and a second pin extending from said bar and adapted to engage the vertically disposed lever during movement of said bar in the other direction to move said lever away from said I lever.

16. In combination, an adding machine having a starting member and a subtract lever extending therefrom, a slidably mounted bar, a cam shaft having a cam thereon operatively connected to said bar to reciprocate the same, an auxiliary motor operatively connected to said cam shaft, a switch for controlling said motor, means under the control of said starting member for controlling said switch, a simple lever operatively connected to said subtract lever, resilient means connected to said lever, a member extending from said simple lever in position to be engaged by said bar for moving said lever against the action of said resilient means into another position, a cam extension provided on said lever, a tripper lever located adjacent to said cam extension and having a cam tooth provided thereon for cooperating with said simple lever, resilient means connected between said two levers and a member extending from said reciprocating bar adapted to engage said tripper lever during the return stroke of said bar.

17. In combination, an adding machine having a starting member and a subtract lever extending therefrom, a slidably mounted bar, a cam shaft having a cam thereon operatively connected to said bar to reciprocate the same, an auxiliary motor operatively connected to said cam shaft, a switch for controlling said motor, means under the control of said starting member for controlling said switch, a simple lever operatively connected to said subtract lever, resilient means connected to said lever, a member extending from said simple lever in position to be engaged by said bar for moving said lever against the action of said resilient means into another position, a cam extension provided on said lever, a tripper lever located adjacent to said cam extension and having a cam tooth provided thereon for cooperating with said simple lever, resilient means connected between said two levers and a member extending from said reciprocating bar adapted to engage said tripper lever during the return stroke of said bar, and adjustable means for moving said member so as to avoid engaging said tripper lever to render subtract lever inoperative.

18. In combination, an adding machine having a motor, a starting member, a subtract lever and a total key, a cam shaft associated with said machine, an auxiliary motor for driving said cam shaft, a switch controlling said motor, a cam on said cam shaft cooperating with said starting member to control the action of said switch, and a second cam on said cam shaft for controlling the operation of said total key and said subtract lever.

19. In combination, an adding machine having a main motor, a starting member and a controlling lever, a control member for actuating said controlling lever, an auxiliary motor for operating said control member, said auxiliary motor being started by the actuation of said starting member, and means intermediate said auxiliary motor and said control member for causing the operation of said control member by said auxiliary motor after said main motor has stopped.

20. In combination, an adding machine having a main motor, a starting member and a controlling lever, a control member for actuating said controlling lever, an auxiliary motor, means operated by said auxiliary motor and operating said control member, said means including a cam shaft having cams thereon, a switch for said auxiliary motor, means operated by said starting member for closing said switch and means actuated by a cam on said cam shaft for opening said switch.

21. In combination, an adding machine having a main motor, a starting member and a controlling lever, a control member for actuating said controlling lever, an auxiliary motor, means operated by said auxiliary motor and operating said control member, said means including a cam shaft having cams thereon, a switch for said auxiliary motor, resilient means normally holding said switch open, means operated by said starting member for closing said switch, means holding said switch closed, and means actuated by a cam on said cam shaft for opening said switch.

22. In combination, an adding machine having a main motor, a starting member and a controlling lever, a control member for actuating said controlling lever, an auxiliary motor, means operated by said auxiliary motor and operating said control member, said means including a cam shaft having cams thereon, a switch for said auxiliary motor, a slidably mounted switch plate operatively connected to said switch for opening and closing the same, resilient means for holding said switch open, a lever having its one end engaging said starting member and having a catch on its other end, a substantially V shaped lever having one arm normally engaged by said catch and its other arm terminating near said cam shaft and operatively connected to said slidably mounted switch plate, resilient means connected to said V lever for closing said switch, a second V lever having means on one arm thereof for engaging said switch plate in closed position for keeping said switch closed and having its other arm terminating near the cam shaft, and a cam on said cam shaft having oppositely disposed extensions therefrom for engaging the ends of the arms of the two V levers.

CLYDE P. EVANS.